Nov. 17, 1936.　　　F. RIEMERSCHMID　　　2,061,290

MOTOR VEHICLE

Filed April 27, 1934　　　2 Sheets-Sheet 1

INVENTOR
FRITZ RIEMERSCHMID
BY C. P. Goepel.
ATTORNEY.

Nov. 17, 1936.                F. RIEMERSCHMID                    2,061,290
                                 MOTOR VEHICLE
                           Filed April 27, 1934            2 Sheets-Sheet 2
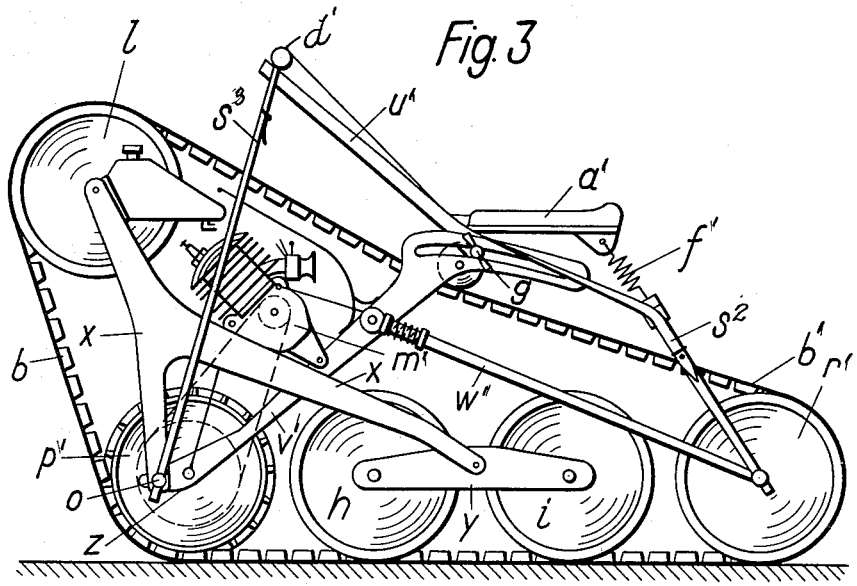
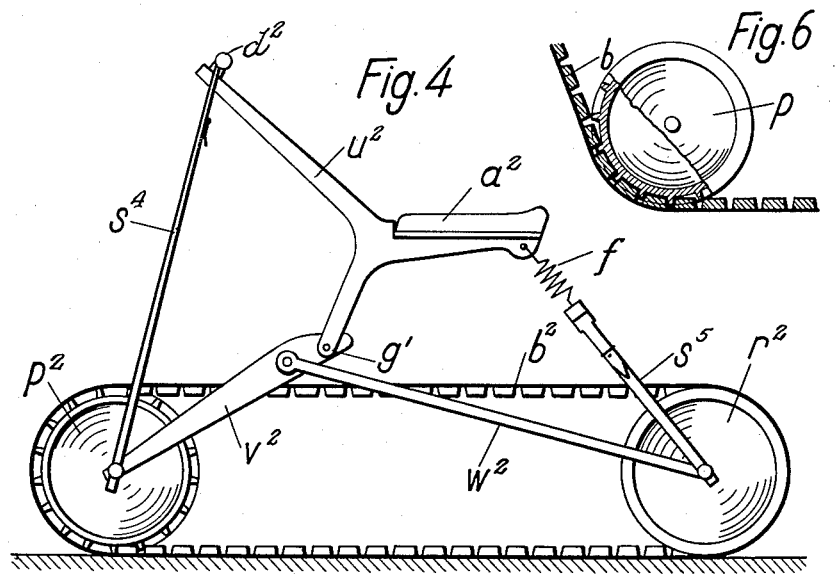
INVENTOR
FRITZ RIEMERSCHMID
BY C. P. Goepel
ATTORNEY.

Patented Nov. 17, 1936

2,061,290

UNITED STATES PATENT OFFICE 2,061,290

MOTOR VEHICLE

Fritz Riemerschmid, Heidenheim-on-the-Brenz, Germany

Application April 27, 1934, Serial No. 722,741
In Germany May 2, 1933

2 Claims. (Cl. 180—9.1)

This invention relates to a single railed vehicle moved on by motor power, the motor power being transferred upon one single encircling boundless band for purpose of locomotion. It is to be used mainly for motion over subsoil and over ground not accessible for the already known motor vehicles. Well-known are single railed motor vehicles moved on by an endless track having a guidable wheel or a guidable runner arranged at front of the device. Vehicles of this kind have the attribute that only one part of the whole weight is able to be fully utilized for directing the driven band upon the track, since always one part of the whole weight, often the main part of this weight, is taken up by the said wheels or runners. Because of this unfavorable distribution of weight, vehicles of such construction are unable to be used over ground in a soft and yielding condition, if the said guidable wheels and guidable runners are not adjusted especially to the various conditions of the ground.

This invention creates a vehicle of simple construction, making it possible to still be able to be moved on by motor powers over any ground or tract of land of the most various conditions.

One arrangement embodying the invention is illustrated in the accompanying drawings in which:

Figure 3 is a view of a modified form of vehicle having more than two tread wheels encircled by one single boundless band driven by motor power, all tread wheels, the motor engine, the mechanism for adjustment and balance being mounted inside of the one single boundless band.

Figure 4 is a side elevation of a further modification showing the arrangement of the driver's seat in connection with the mechanism for adjustment of the tension relating to the one single boundless band.

Figure 6 is a view of the cogwheel mechanism.

Figure 1:
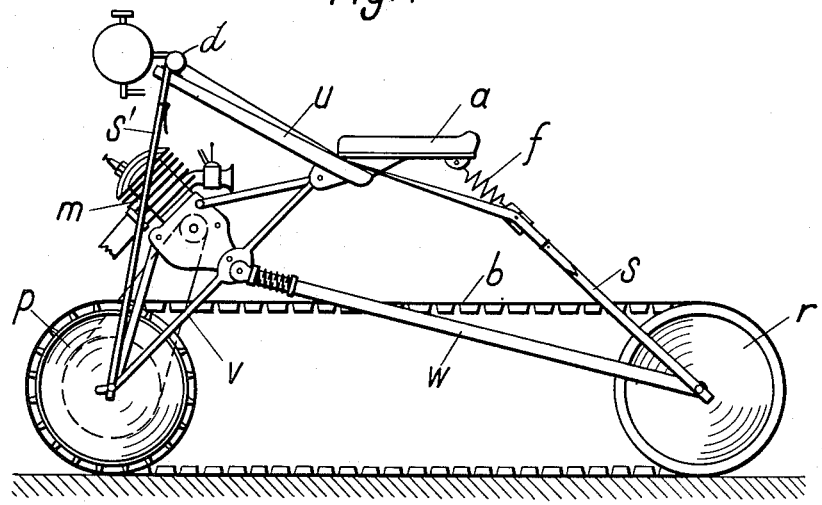
Figure 1 is a view of a vehicle having two tread wheels encircled by one single boundless band driven on by motor power. The motor engine, driver's seat and the guiding mechanism are mounted outside of the encircling band.
Figure 2:
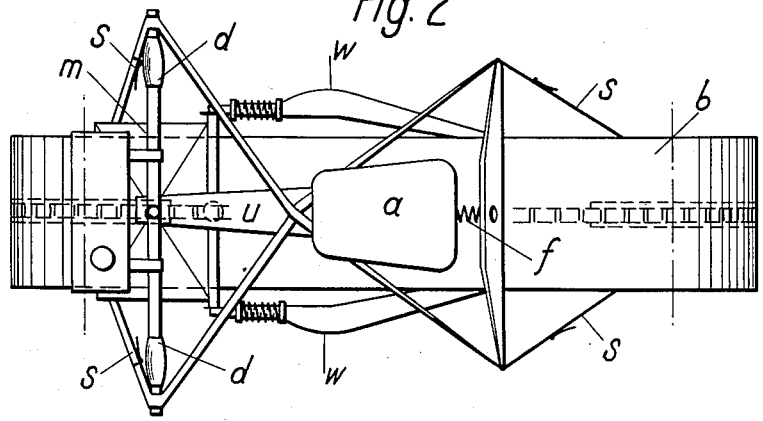
Figure 2 is a ground plan relative to Fig. 1.

Referring more explicitly to Figures 1 and 2, I show the project of a vehicle having one front wheel $p$, and one wheel behind $r$, which are encircled by one single boundless band $b$, these wheels bearing the pivoted or knee lever frame sections $s'$, $v$, $w$, $s$, also the mechanism $d$ for guiding the vehicle $u$ and the adjustable driver's seat $a$. A spring $f$ is between the upper end of the frame section $s$ and the seat $a$, and the lower ends of the frame sections $s$ and $v$ are pivoted as at $z$.

The wheels in Fig. 1 are surrounded by the encircling boundless band $b$ which causes the locomotion. This band $b$ is stretched only by the driver's weight, the weight of the whole framework, including the motor $m$ and accessories, in connection with a flexible yielding connection $f$. The steering gear $d$ is also fastened to the framework, as shown in Fig. 2.

The knee lever construction of the frame is formed by pivotally connecting the frame member $w$ at its forward end to the frame member $v$ at a point intermediate the ends of the member $v$. The member $w$ has its rear end mounted on the axle of the rear wheel $r$, and the member $v$ has its lower end mounted on the axle $z$ of the front wheel $p$.

By adjusting the motor $m$ and accessories relative to the encircling band $b$, important advantages for the construction of the vehicle result. The starting impulse of the vehicle takes place through the motor, direct or indirect, through means of a power transmission, one or more of the wheels gearing together by means of teeth, or otherwise within certain spaces which are arranged on the flexible guiding band, as shown in Fig. 6.

The seat $a$ is secured to a frame member $u$ which is secured at one end to the upper end of the frame member $s'$ and also to the upper end of the frame member $v$. The seat $a$ is also secured to the tensioning member $f$ so that weight placed on the seat $a$ will automatically tighten the boundless band $b$.

In Figure 3 there is shown a modified form of a vehicle, which includes a frame structure $s^2$, $v'$, $w'$, $s^3$, which is similar to the frame structure shown in Figs. 1 and 2. The boundless band $b'$ is trained over the wheels $r'$ and $p'$ secured to the frame, but in this construction additional wheels $h$, $i$, and $l$ are provided, the wheels $h$ and $i$ being carried by a frame piece $y$ disposed between the wheels $p'$ and $r'$, and the frame piece $y$ is secured to one leg of an inverted Y-frame, which has the other leg secured to a pivot member $o$ carried by the frame member $v'$. The wheel $l$ is carried by the stem portion of the Y-frame, and is mounted upwardly and forwardly of the front wheel $p'$. A seat $a'$ is adjustably secured to the upper end of the frame member $v'$ as at $g$, and the upper end of the frame member $v'$ is connected to the upper end of the frame member $s^3$ by a bar or connecting frame member $u'$. A spring or tensioning means $f'$ engages the rear end of the seat $a'$ and also engages the frame member $s^2$, so that this seat $a'$ may be suitably adjusted and tensioned. A motor $m'$ is attached to the frame member $v'$ and may be operatively engaged with the front wheel $p'$ by means of a flexible member, such as a chain, belt or the like.

By guiding the encircling band $b'$ over the upper wheel $l$, which through its arrangement at one end of the frame member $x$ serves also as a pressure equalizing wheel, there will be caused a well equalized pressure for all positions of the guiding wheels $p'$, $h$, $i$, $r'$, as the result of the displacement $o$ in relation to the axis of the front wheel $p'$ which is a particular feature of the vehicle, as well as important for the adjustment to any conditions of the ground.

In Figure 4 there is disclosed another form of vehicle, having a frame structure $s^4$, $s^5$, $w^2$, $v^2$, wherein the frame members $v^2$ and $w^2$ are pivoted together at one end, and the frame member $v^2$ at the other or forward end is pivoted to the axle of the front wheel $p^2$, while the frame member $w^2$ is pivoted at the other end to the rear wheel $r^2$, and a boundless band $b^2$ is trained over these wheels $p^2$ and $r^2$. A seat supporting member $u^2$ is secured as at $g'$ to the upper end of the frame member $v^2$ and is also secured to the upper end of the frame member $s^4$. The seat $a^2$ is tensioned by means of a spring $f^2$ engaging the upper end of the frame member $s^5$.

The steering of the vehicle can be accomplished in several ways. Firstly, through turning one or more wheels in such a manner that the displacement of the central turning point guarantees the symmetrical course of the yielding band over the other wheels. Secondly, turning may be effected through inclining the vehicle towards the inside of the curve being taken.

The driver is therefore able to retain a comfortable position and at the same time to change the distribution of the entire weight and pressure upon all wheels. The driver is able to maintain the seat in a horizontal position during the ascent or descent of the vehicle in such a manner that the most advantageous distribution of pressure can be brought to the ground.

Figure 5:
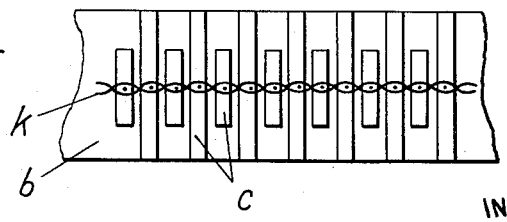
Figure 5 is a view of the single boundless band in connection with the mechanism for adjustment of the tension.

An encircling band, as shown in Figure 5 is provided consisting of a looped steel rope $k$ secured to transversely disposed sticks $c$ which may extend either entirely across the band, or alternately entirely across the band and partly thereacross.

I claim:

1. A vehicle as set forth comprising an endless band, a pair of frame members, means for pivoting said frame members together in upwardly convergent relation, wheels journalled in the opposite ends of said frame members and disposed within said band, power means for said wheels, a seat pivotally secured to one of said frame members, and tensioned means for the seat.

2. A vehicle as set forth comprising an endless band, a plurality of frame members pivoted together in upwardly convergent relation, wheels carried by the divergent ends of said frame members and engaging within said band, a seat structure pivoted to one of said frame members, and yieldable means engaging said seat structure, said wheels being moved away from each other by pressure upon the seat whereby to tension said band.

FRITZ RIEMERSCHMID.